US012700400B2

(12) United States Patent
Pattabiraman et al.

(10) Patent No.: US 12,700,400 B2
(45) Date of Patent: Aug. 4, 2026

(54) SCALABLE HIGH-ACCURACY TRANSACTIONAL AGENTS

(71) Applicant: Google LLC, Mountain View, CA (US)

(72) Inventors: Aishwariya Pattabiraman, Fremont, CA (US); Scott Bradley Huffman, Portola Valley, CA (US); Siddhartha Reddy Jonnalagadda, Sunnyvale, CA (US); Ashwin Ram, Los Altos, CA (US); Lee Boonstra, Amstelveen (NL); Erick Armbrust, San Francisco, CA (US); Jack Fales, San Francisco, CA (US); Yingchao Huang, Fremont, CA (US); Adrian Otto, Mountain View, CA (US); Matthew O'Connor, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 18/741,866

(22) Filed: Jun. 13, 2024

(65) Prior Publication Data
US 2025/0078820 A1    Mar. 6, 2025

Related U.S. Application Data

(60) Provisional application No. 63/534,875, filed on Aug. 28, 2023.

(51) Int. Cl.
*G10L 15/18* (2013.01)
*G10L 15/22* (2006.01)

(52) U.S. Cl.
CPC .......... *G10L 15/1815* (2013.01); *G10L 15/22* (2013.01)

(58) Field of Classification Search
None
See application file for complete search history.

(56) References Cited

U.S. PATENT DOCUMENTS

2016/0379632 A1* 12/2016 Hoffmeister ........... G10L 25/87
                                                        704/253
2019/0035387 A1* 1/2019 Zitouni ................. G10L 15/063

* cited by examiner

*Primary Examiner* — Nafiz E Hoque
(74) *Attorney, Agent, or Firm* — Lerner David LLP

(57) ABSTRACT

Aspects of the disclosure are directed to a transactional agent for user interactions. The agent can seamlessly respond to user requests in a conversational manner while maintaining the conversational state. The agent can include a multi-stage modular model architecture, including a semantic understander and a semantic matcher. The semantic understander can be configured to understand common conversation conventions and/or patterns to produce a structure representation of a user request. The semantic matcher can be configured to map items and modifiers to product entries for a particular domain.

15 Claims, 8 Drawing Sheets

700

Receiving a conversational input associated with a user request ~710

Generating a structure representation of the conversational input ~720

Matching the structured representation with an action for responding to the user request ~730

Outputting the action for responding to the user request ~740

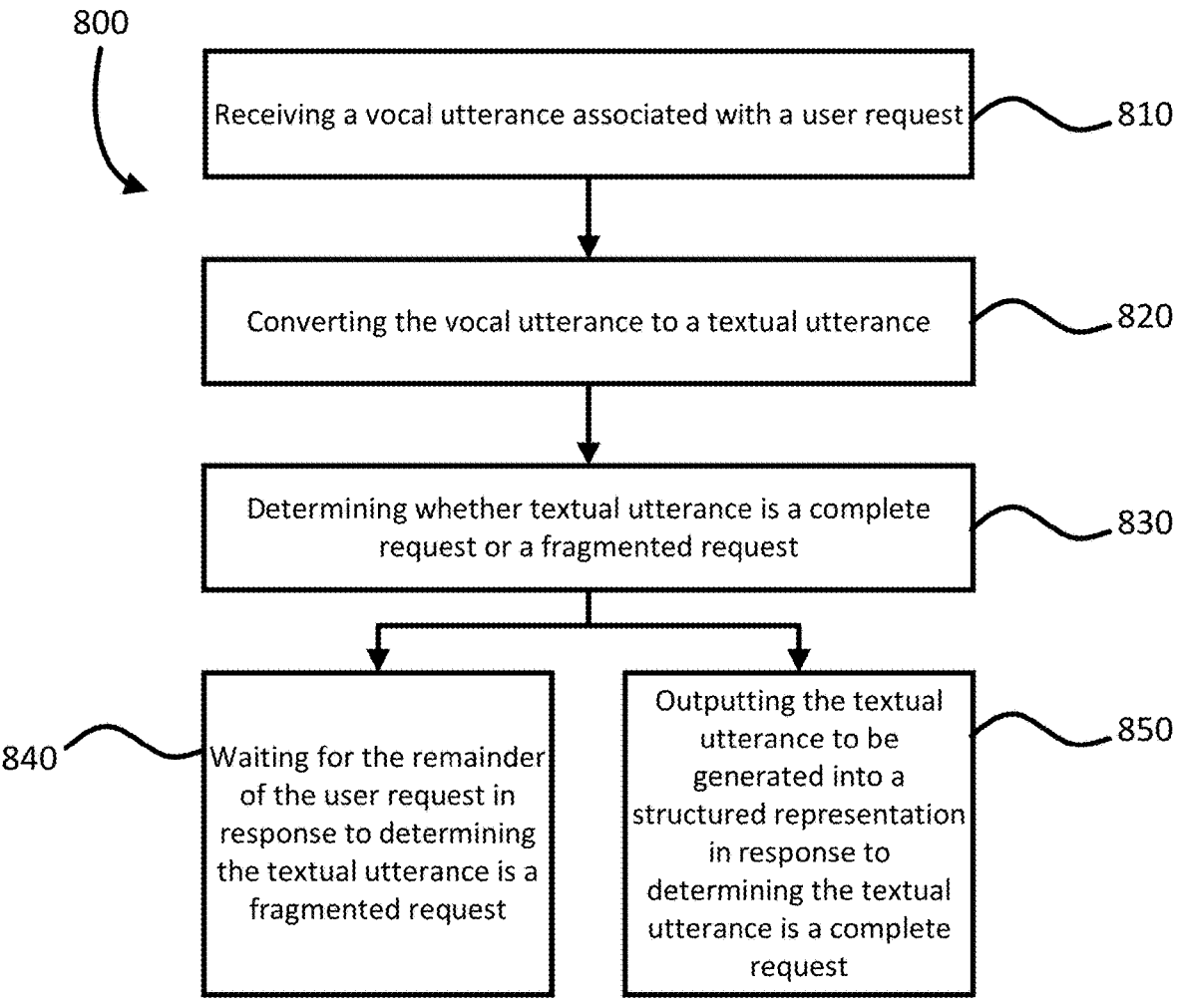

800

Receiving a vocal utterance associated with a user request ⌇—810

Converting the vocal utterance to a textual utterance ⌇—820

Determining whether textual utterance is a complete request or a fragmented request ⌇—830

840 ⌇ Waiting for the remainder of the user request in response to determining the textual utterance is a fragmented request Outputting the textual utterance to be generated into a structured representation in response to determining the textual utterance is a complete request ⌇—850

FIG. 8

SCALABLE HIGH-ACCURACY TRANSACTIONAL AGENTS

CROSS-REFERENCE TO RELATED APPLICATIONS

The present application claims the benefit of the filing date of U.S. Provisional Patent Application No. 63/534,875, filed Aug. 28, 2023, the disclosure of which is hereby incorporated herein by reference.

BACKGROUND

An ideal user experience for interactions with an artificially intelligent (AI) agent may require the agent to respond to users in a conversational manner, thereby avoiding requiring the user to understand complex interfaces or organizational structures of underlying information. The interactions can be informational, like searches, or transactional, like purchases. Transactional interactions can be particularly difficult because the agent may need to understand and participate in a conversational dialog while keeping track of order history, understanding semantic terms and speech acts, mapping user requests to entries, responding with multimodal cues, and/or incorporating business logic. For example, for a user ordering food at a drive thru, a conversation may include the user ordering multiple items, referring to items with names not on the menu, changing their mind, pausing and thinking, asking questions, asking to speak with a human, etc. The agent may struggle to respond in a quick, intuitive, and easy-to-understand manner while keeping track of the conversational state.

BRIEF SUMMARY

Aspects of the disclosure are directed to a transactional agent for user interactions. The agent can seamlessly respond to user requests in a conversational manner while maintaining the conversational state. Through these user interactions, the agent can understand and fulfill the user requests with high accuracy, regardless of whether there is ambiguity in the user request. The agent can further be versatile, handling changes in entries without requiring expensive retraining or fine-tuning of specialized AI models.

The agent can include a multi-stage modular large language model architecture, including a semantic understander and a semantic matcher. The semantic understander can be configured to understand common conversation conventions and/or patterns to produce a structured representation of a user request. The semantic understander can further be configured to maintain a conversational state over multiple turns by passing the structured representation as part of the context for the next prompt-based interaction. The semantic matcher can be configured to map items and modifiers to product entries for a particular domain. The multi-stage modular architecture can further include an utterance finalizer configured to detect incomplete communications from a speech kiosk using an endpointing model.

An aspect of the disclosure provides for a method for processing a conversational transaction including: receiving, by one or more processors, a conversational input associated with a user request; generating, by the one or more processors, a structured representation of the conversational input using an instruction-prompted machine learning model; matching, by the one or more processors, the structured representation with an action for responding to the user request using an encoder-based machine learning model;

and outputting, by the one or more processors, the action for responding to the user request.

Another aspect of the disclosure provides for a system including: one or more processors; and one or more storage devices coupled to the one or more processors and storing instructions that, when executed by the one or more processors, cause the one or more processors to perform operations for the method for processing a conversational transaction. Yet another aspect of the disclosure provides for a non-transitory computer readable medium for storing instructions that, when executed by one or more processors, cause the one or more processors to perform operations for the method for processing a conversational transaction.

In an example, the conversational input is a vocal utterance; and the method further includes converting, by the one or more processors, the vocal utterance to a textual utterance. In another example, the method further includes: determining, by the one or more processors, that the textual utterance is a fragmented request; and waiting, by the one or more processors, for the remainder of the user request in response to determining the textual utterance is a fragmented request. In yet another example, determining the textual utterance is a fragmented request is based on at least one of a processing via an endpointing model, a last word in the textual utterance, or processing via a large language model (LLM).

In yet another example, generating the structured representation further includes updating actions based on a current action state, a conversation history, and the conversational input. In yet another example, matching the structured representation with an action for responding to the user request further includes generating an embedding to represent the structured representation. In yet another example, matching the structured representation with an action for responding to the user request further includes matching the embedding with one or more embeddings representing a catalog of potential actions for responding to the user request. In yet another example, outputting the action for responding to the user request further includes outputting further clarification is needed in response to multiple matching actions.

BRIEF DESCRIPTION OF THE DRAWINGS

FIG. 8 depicts a flow diagram of an example process for processing a conversational transaction where the conversational input is received through a speech kiosk according to aspects of the disclosure.

DETAILED DESCRIPTION

Figure 1:
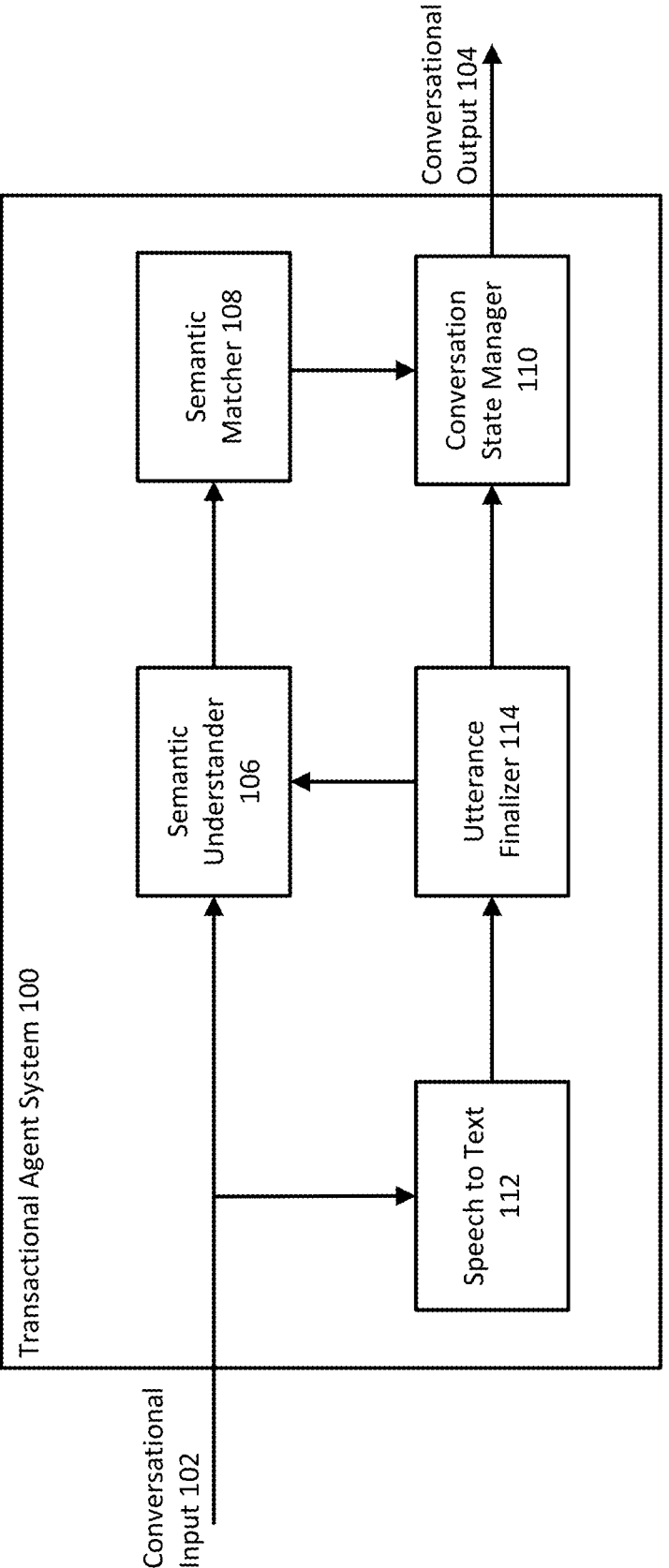
FIG. 1 depicts a block diagram of an example transactional agent system for processing conversations with users according to aspects of the disclosure.

The technology generally relates to a transactional agent for user interactions. The agent can seamlessly respond to user requests in a conversational manner while maintaining the conversational state. Through these user interactions, the agent can understand and fulfill the user requests with high accuracy, regardless of whether there is ambiguity in the user request.

The agent can understand and participate in a conversational dialog with the user while keeping track of order history, understanding domain-related semantic terms and speech acts, mapping user requests to one or more entries, responding with multimodal cues, and/or incorporating business logic. Domain-related semantic terms may include items, attributes, and/or modifiers of an order, as examples. Speech acts may include conversational manners to state common actions, such as add, modify, remove, and/or substitute, as examples. Entries may include product catalog entries and/or items for an order, as examples. Multimodal cues may include speech and/or images, as examples. Business logic may include including a welcome message, suggesting an upsell to the entries selected by the user, and/or suggesting joining a rewards program, as examples.

For example, a user may order food at a drive thru by conversing with the transaction agent. The conversation may include potential ambiguities, such as the user ordering multiple items, referring to items with names not on the menu, changing their mind, pausing and thinking, asking questions, asking to speak with a human, etc. The transactional agent can process the conversation with the user to generate the order, despite these potential ambiguities.

The agent can further be versatile, handling changes in entries without requiring expensive retraining or fine-tuning of specialized AI models, thus allowing for reduced processing cost and memory usage. For example, menu items for a drive thru restaurant may be added, removed, and/or modified. The transactional agent can still process the conversation with the user to generate the order without being retrained or fine-tuned on the altered menu.

The transactional agent can include a multi-stage modular large language model architecture. The architecture can include a semantic understander and a semantic matcher. The architecture can further include an utterance finalizer if the transactional agent is interacting with a user through speech recognition. The semantic understander can be configured to understand conversational parlance to produce a structured representation of a user request. The semantic understander can further be configured to maintain a conversational state over multiple turns, e.g., interactions with the user, by passing the structured representation as part of the context for the next interaction. The semantic matcher can be configured to map items and/or modifiers received from the user to product entries of a catalog. The utterance finalizer can be configured to detect incomplete communications using an endpointing model.

FIG. 1 depicts a block diagram of an example transactional agent system 100 for processing conversations with users. The conversations with users can include ordering items on a menu, ordering products from a website, and/or providing customer service to users, as examples. The transactional agent system 100 can be implemented on one or more computing devices in one or more locations. The transactional agent system 100 may be part of a remote system in communication with one or more user devices via a network. The remote system may be a single computer, multiple computers, or a distributed system like a cloud environment. The remote system may include computing resources, such as data processing hardware, and storage resources, such as memory hardware. A data store, such as a remote storage device, may be overlain on the storage resources to allow scalable use of the storage resources by one or more of the clients, such as the user devices, or the computing resources. The data store can be configured to store a plurality of data blocks within one or more tables, such as a cloud database, that each include a plurality of rows and columns. The data store may store any number of tables.

The transactional agent system 100 can be configured to receive a conversational input 102 associated with a user request, such as from a user device via the network, from a speech kiosk for receiving speech input, and/or from an input kiosk for receiving text input. The conversational input 102 may be natural language speech and/or text received from a user. Example user requests can include ordering one or more items from a menu, depositing checks at a bank, ordering one or more products from a website, and/or resolving an issue related to customer service. The user device, speech kiosk, and/or input kiosk may correspond to any computing device, such as a desktop workstation, a laptop workstation, or a mobile device, such as a smartphone. The user device, speech kiosk, and/or input kiosk can include computing resources and storage resources. Each conversational input 102 can request one or more tasks for the transactional agent system 100 to generate a conversational output 104 associated with one or more results for the tasks, such as based on training data and/or inference data on which to perform the tasks. The transaction agent system 100 can return the conversational output 104, such as to the user device, speech kiosk, and/or input kiosk via the network as a response.

The transactional agent system 100 can include a semantic understander 106, a semantic matcher 108, and a conversation state manager 110. The transactional agent system 100 can further include a speech to text 112 and an utterance finalizer 114. The semantic understander 106, semantic matcher 108, conversation state manager 110, speech to text 112, and/or utterance finalizer 114 can be implemented as one or more computer programs, specially configured electronic circuitry, and any combination thereof.

The semantic understander 106 can be configured to comprehend conversational parlance, such as common conversational conventions and/or patterns used for user requests, such as food or product ordering. The semantic understander 106 can generate a structured representation of the user request. The structured representation can include structured or unstructured data passed in binary or serialization formats, such as JSON, YAML, XML, CSV, etc. For example, the semantic understander 106 can convert the user request, "Can I get a chicken sandwich with honey mustard", to a JSON format of the user requesting a "chicken sandwich" modified with "honey mustard". The semantic understander 106 can include an instruction-prompted machine learning model, such as a large language model (LLM). The prompt can include a goal of updating instructions based on a current instruction state, conversation history, and utterance. For example, the prompt can include instructing the LLM to be a food ordering agent with a goal of updating an order in JSON based on a current order state, conversation history, and utterance. The order should adhere to a provided schema, where each item in the order should have a separate entry in the "items" array. The output should only be valid JSON.

The semantic matcher 108 can be configured to map aspects of the user requests in the structured representation to a catalog of actions. For example, the semantic matcher 108 can match items and modifiers in the structured representation to items and modifiers on the actual menu, such as resolving "chicken sandwich", which may not be a menu item, to "cluck cluck", which is a menu item. The semantic matcher 108 can include an encoder-based machine learning model, such as a two-tower encoder-only LLM. The encoder-based machine learning model can produce embeddings for the catalog of actions at training time and produce embeddings for user requests at run time. The encoder-based machine learning model can include a matcher, such as a fast nearest-neighbor matcher to identify and output a match using the encodings. If there are multiple matches or no matches, the semantic matcher 108 can output that further clarification is needed.

The conversation state manager 110 can be configured to store the actions output from the semantic matcher 108 to maintain the conversational state. The conversation state manager 110 can store the actions temporarily as the interaction with the user is occurring. The conversation state manager 110 can also incorporate business logic for interacting with the user, such as from an external application programming interface (API). The conversation state manager 110 can further be configured to ask for further clarification if the semantic matcher 108 outputs multiple matches or no matches for actions associated with the user request. The conversation state manager can pass the structured order representation, or the order state, to the semantic understander 106 as context for the next prompt-based interaction with the user. At each turn conversing with the user, the semantic understander 106 can augment the context with the results of the next request by the user, thereby additively providing context for each subsequent turn. If the user refers back to a previous action or item, the conversation state manager 110 can use the semantic matcher 108 to match the previously referenced action or item against the stored actions to find a match for that action or item. For example, in response to a user changing their mind, stating "actually, I don't want fries. Could you make that onion rings", the conversation state manager 110 can use the semantic matcher 108 to find "fries" in the stored order and "onion rings" from the menu and replace onion rings with fries in the stored order.

If the user is providing requests through a speech kiosk, the transactional agent system 100 can further include a speech to text 112 and an utterance finalizer 114. The speech to text 112 can be configured to convert speech from the user into text for processing by the utterance finalizer 114. The speech to text 112 can utilize any speech recognition technology in any language. For example, the speech to text 112 can break down speech into phonemes and then utilize a rule-oriented interpreter to judge what the phonemes mean in a given context to disambiguate words that sound similar but have different meanings. As another example, the speech to text 112 can map multiple languages over the same language structure through an intent embedding. The sounds spoken can map to numerical values that are closest matched to the likely meaning of the utterance. The meanings can be determined through a model pre-training process.

The utterance finalizer 114 can be configured to determine whether the user is finished with their request, accounting for "stop and think" behavior that can occur with transactional conversations. For example, the user may say "umm . . . ", "let me think", or just pause without saying anything. As another example, the user may say "can I get a burger with tomatoes and umm . . . " and pause. The utterance finalizer 114 can determine whether to wait for the user to complete their request before sending the request to the semantic understander 106. The speech to text 112 can send utterances converted to text to the utterance finalizer 114, which can be stored in a speech cache. The utterance finalizer 114 can include an endpointing model that can detect whether the utterance in the speech cache is complete. For example, the endpointing model can assume the utterance is incomplete or fragmented based on the last word in the utterance, such as last words "and", "with", "extra", "umm". As another example, the endpointing model can determine whether the utterance is final or fragmented using a text classifier or machine learning model that can identify current inputs as complete or incomplete. For example, the text classifier or machine learning model can utilize regex pattern matching for text strings against a known list or a Bayesian inference classifier trained against a corpus of known termination words or utterances. The utterance finalizer 114 can also send the request to the semantic understander 106 after a predetermined amount of time after the utterance, such as 5 seconds. The utterance finalizer 114 can further provide a response through the conversation state manager 110, indicating to the user that the user has not completed their request.

Figure 2:
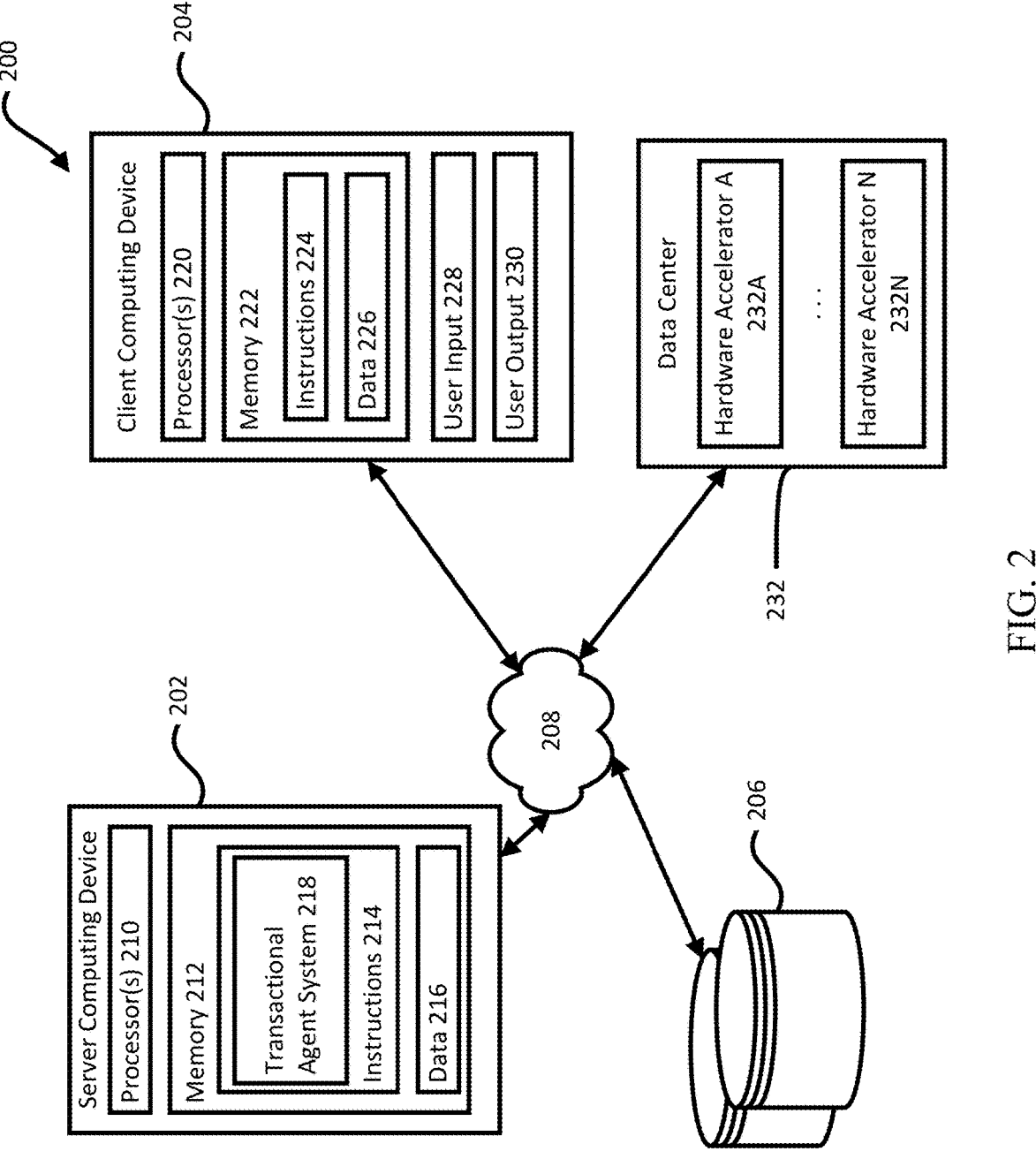
FIG. 2 depicts a block diagram of an example environment for implementing a transactional agent system according to aspects of the disclosure.

FIG. 2 depicts a block diagram of an example environment 200 for implementing a transactional agent system 218. The transactional agent system 218 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing a transactional system 218, which can correspond to the transactional agent system 100 of FIG. 1. The transactional agent system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a data center 232 housing any number of hardware accelerators 232A-N. The data center 232 can be one of multiple data centers or other facilities in which various types of computing devices, such as hardware accelerators, are located. Computing resources housed in the data center 232 can be specified for deploying models related to various transactional requests as described herein.

The server computing device 202 can be configured to receive requests to process data from the client computing device 204 on computing resources in the data center 232. For example, the environment 200 can be part of a computing platform configured to provide a variety of services to users, through various user interfaces and/or application programming interfaces (APIs) exposing the platform services. The variety of services can include conversational tasks associated with ordering items on a menu, ordering products from a website, and/or providing customer service to users, as examples. The client computing device 204 can transmit input data associated with requests for the transactional agent system 218. The transactional agent system 218 can receive the input data, and in response, generate output data including a response to the request.

As other examples of potential services provided by a platform implementing the environment 200, the server computing device 202 can maintain a variety of models in accordance with different constraints available at the data center 232. For example, the server computing device 202 can maintain different families for deploying models on various types of TPUs and/or GPUs housed in the data center 232 or otherwise available for processing.

Figure 3:
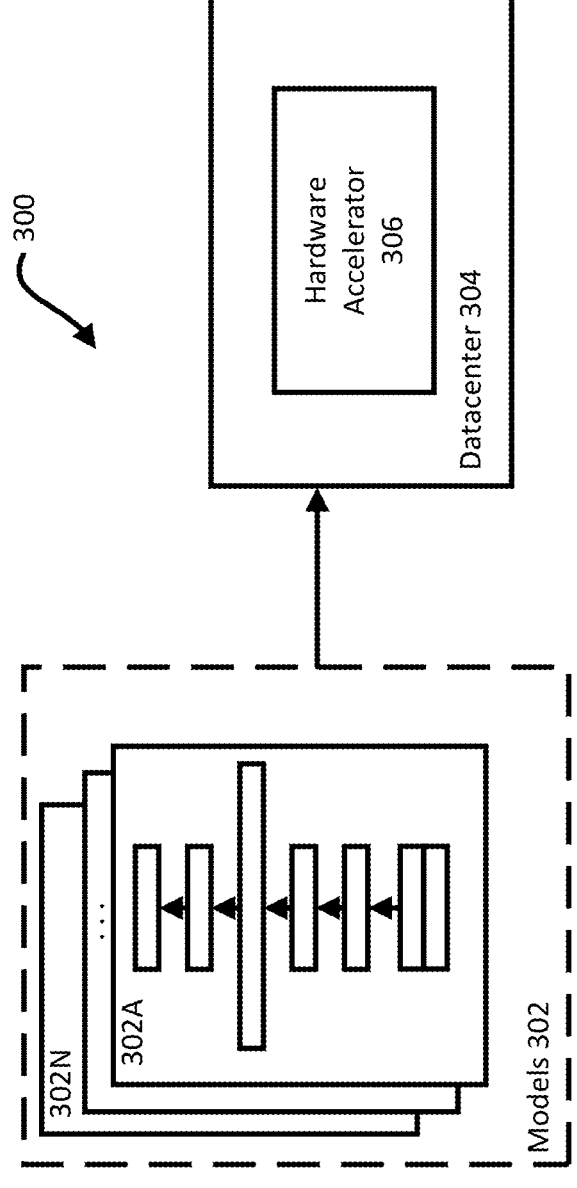
FIG. 3 depicts a block diagram illustrating one or more model architectures according to aspects of the disclosure.

FIG. 3 depicts a block diagram 300 illustrating one or more model architectures 302, more specifically 302A-N for each architecture, for deployment in a datacenter 304 housing a hardware accelerator 306 on which the deployed models 302 will execute, such as for providing natural language processing. The hardware accelerator 306 can be any type of processor, such as a CPU, GPU, FPGA, or ASIC such as a TPU.

An architecture 302 of a model, such as a LLM, can refer to characteristics defining the model, such as characteristics of layers for the LLM, how the layers process input, or how the layers interact with one another. The architecture 302 of the model can also define types of operations performed within each layer. One or more model architectures 302 can be generated that can output results, such as for natural language processing.

The model can be trained according to one of a variety of different learning techniques. Learning techniques for training the model can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

Referring back to FIG. 2, the devices 202, 204 and the data center 232 can be capable of direct and indirect communication over the network 208. For example, using a network socket, the client computing device 204 can connect to a service operating in the data center 232 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTER standard for wireless broadband communication. The network 208, in addition or alternatively, can also support wired connections between the devices 202, 204 and the data center 232, including over various types of Ethernet connection.

Although a single server computing device 202, client computing device 204, and data center 232 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Figure 4:
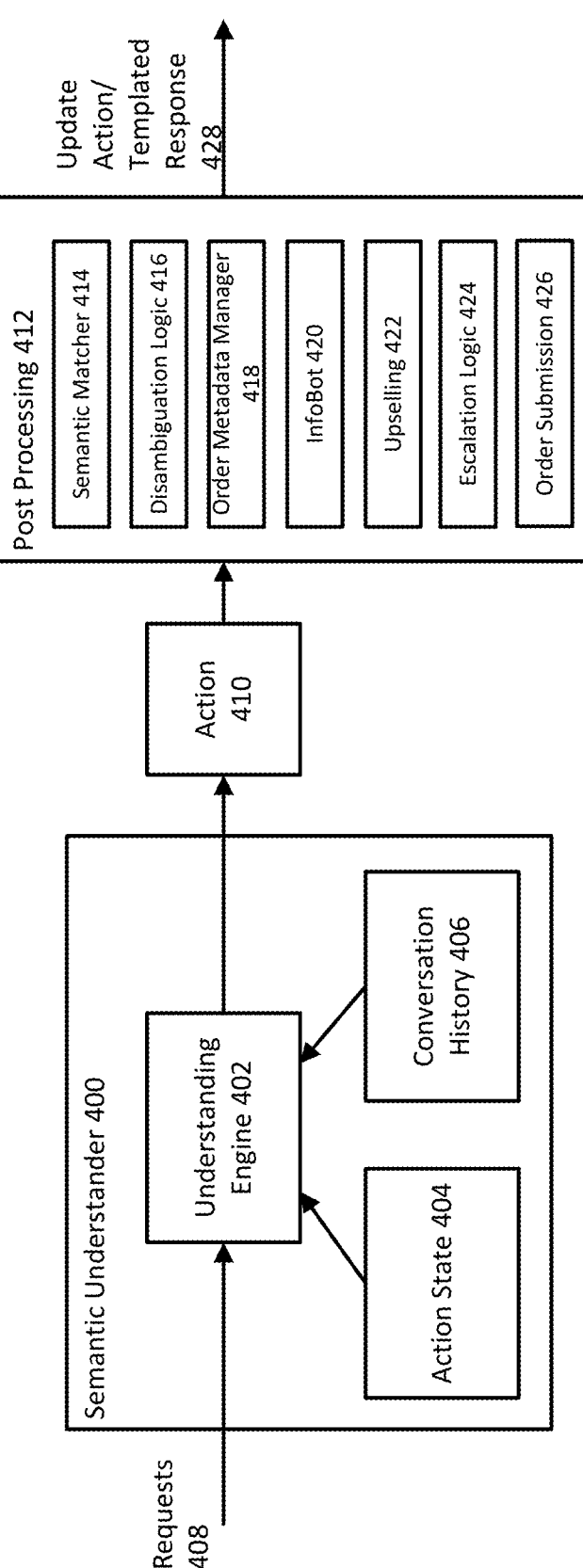
FIG. 4 depicts a block diagram of an example semantic understander according to aspects of the disclosure.

FIG. 4 depicts a block diagram of an example semantic understander 400. The semantic understander 400 can correspond to the semantic understander 106 as depicted in FIG. 1. The semantic understander 400 can be implemented on one or more computing devices in one or more locations. The semantic understander 400 can include an understanding engine 402 and storage for an action state 404 and a conversation history 406. The understanding engine 402 can receive requests 408, such as utterances from an utterance finalizer or as textual input from a kiosk or user device. The understanding engine 402 can process the requests 408 via an instruction-prompted machine learning model using the action state 404 and conversation history 406 to output an action 410 as a structured representation of the request 408. The understanding engine 402 can convert conversational parlance to a structured representation.

The instruction-prompted machine learning model can be trained and/or evaluated with a test harness capable of generating synthetic examples of actions with natural sentence patterns typically used during conversations, allowing for rapidly testing and iterating on prompts for the machine learning model. The test harness can include manually generated examples or automatically generated examples through automated machine learning or neural architecture searching.

The test harness can include a template based synthetic data generator, a multi-turn test case evaluator, and a multi-turn interactive dialog simulator. The template based synthetic data generator can use a catalog of actions as a source of truth to generate any number of possible action combinations, e.g., thousands to millions of possible action combinations. The possible action combinations can be used for training and evaluation of the instruction-prompted machine learning model. The data can be further augmented with variety through manual augmentation or automatic augmentation using an LLM. The multi-turn test case evaluator can read test cases, e.g., utterances and intermediate order states, using data from the data generator and run concurrent evaluations to determine overall accuracy, latency, and error test cases. The multi-turn interactive dialog simulator can provide an interactive text based interface for end-to-end testing. User input is received from a terminal, and, for each turn, the simulator displays a pending action state, response, and latency. Full dialog and intermediate order states can be saved as prime test cases for training, evaluation, or regression testing purposes.

The semantic understander 400 can output the action 410 to a post processing module 412. The post processing module 412 can correspond to the semantic matcher 108 and conversation state manager 110 as depicted in FIG. 1. The post processing module 412 can be implemented on one or more computing devices in one or more locations. The post processing module 412 can include, as examples, a semantic matcher 414, disambiguation logic 416, an order metadata manager 418, an infobot module 420, an upselling module 422, escalation logic 424, and/or an order submission module 426. The semantic matcher 414 can be configured to map aspects of the user requests in the structured representation to a catalog of actions.

The disambiguation logic 416 can be configured to determine whether to seek additional input from the user, such as if the semantic matcher 414 provides no results or provides multiple possible matches. For example, the disambiguation logic 416 can respond to the user with "Sorry, we don't have X, what else can I help you with?" for no matches or "For X, we have A, B, and C". Which would you like?" for multiple matches. The multiple options for the user to select can be sorted by popularity or price, as examples. The disambiguation logic 416 can further be configured to review context of the request, and based on logic for processing previous orders, determine the most likely intent from context, item popularity, and/or other available signals like order history. The disambiguation logic 416 can also be configured to force-match ambiguous queries based on predetermined logic. The disambiguation logic 416 can confirm the order with the user if a selection is below a confidence threshold. The disambiguation logic 416 can further update metadata for the order once clarified.

The order metadata manager 418 can be configured to convert the structured representation from the semantic understander 410 into a request payload that can be processed by the APIs in the post processing module 412, e.g., the semantic matcher 414, disambiguation logic 416, an order metadata manager 418, an infobot module 420, an upselling module 422, escalation logic 424, and/or an order submission module 426. The order metadata manager 418 can be configured to predict the API call that matches the intent of the user from the structured representation.

The infobot 420 can be configured to allow the user to access a corpus of facts about potential actions or orders to be requested by the user for the purpose of answering questions about them. For example, for ordering food from a menu, the infobot 420 can be configured to answer how many calories are in a particular menu item, what ingredients or allergens are in a particular menu item, which menu item is the most popular, etc.

The upselling module 422 can be configured to output a suggested upsell, e.g., a combo meal or joining a rewards program, compared to the action requested by the user.

The escalation logic 424 can be configured to request human intervention if the action requested by the user cannot be completed or based on other issues that may be occurring with the transactional agent system, such as a technical malfunction, excessive environment noise, a timeout where no API calls have resulted through the order metadata manager 418 even though the user and agent have been interacting for a period of time, e.g., 2 minutes. The escalation logic 424 can further be configured to escalate based on the sentiment of the user monitored through the semantic understander 410, limiting user frustration by catching user irritation early and escalating to a human.

The order submission module 426 can be configured to output a completed set of actions from the semantic matcher 414 and/or to display as an updated action and/or templated response 428 for confirmation by the user.

Figure 5:
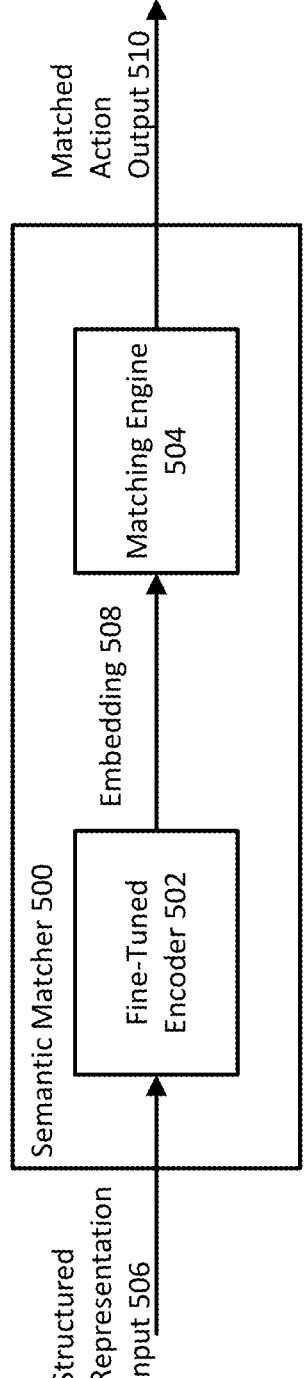
FIG. 5 depicts a block diagram of an example semantic matcher according to aspects of the disclosure.

FIG. 5 depicts a block diagram of an example semantic matcher 500. The semantic matcher 500 can correspond to the semantic matcher 108 as depicted in FIG. 1 or the semantic matcher 414 as depicted in FIG. 4. The semantic matcher 500 can be implemented on one or more computing devices in one or more locations. The semantic matcher 500 can include a fine-tuned encoder 502 and a matching engine 504.

The fine-tuned encoder 502 can receive a structured representation of a user request as input 506 and generate an embedding 508 associated with the structured representation. The matching engine 504 can receive the embedding 508 and match the embedding 508 with one or more embeddings associated with a catalog of actions. The matching engine 504 can output the one or more matches as the action 510 to be performed based on the user request.

The fine-tuned encoder 502 and matching engine 504 can be implemented as an encoder-based machine learning model. The encoder-based machine learning model can include a two-tower encoder-only LLM and a fast nearest-neighbor matcher to respectively generate embeddings 508 and output a match 510 using the embeddings. The encoder-based machine learning model can also include Levenstein distance matching, k-means clustering, and/or heuristic score based ranking for matching the embeddings 508. The encoder-based machine learning model can produce embeddings for the catalog of actions at training time and produce embeddings for user requests at run time.

Figure 6:
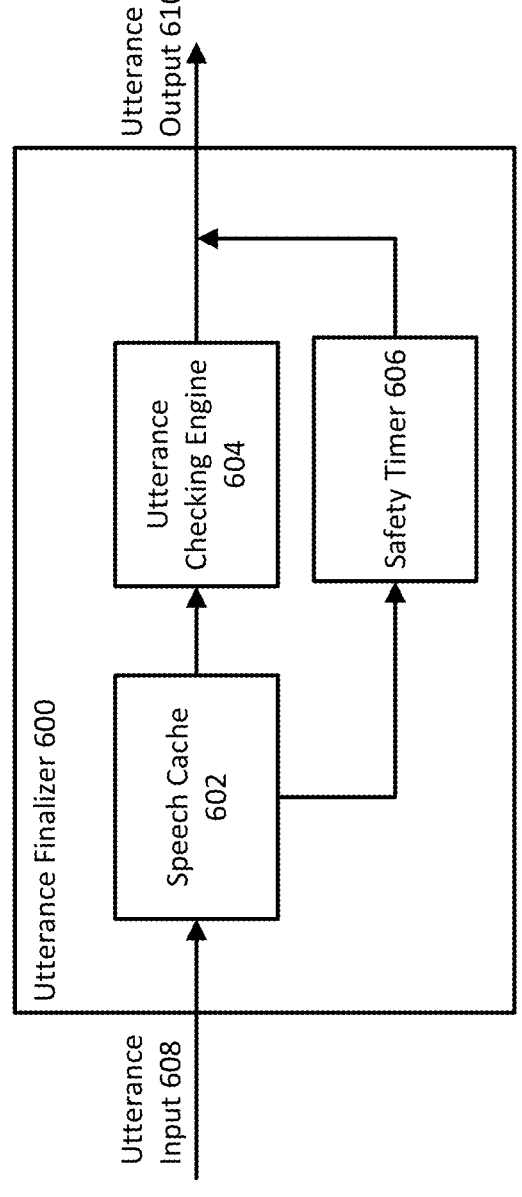
FIG. 6 depicts a block diagram of an example utterance finalizer according to aspects of the disclosure.

FIG. 6 depicts a block diagram of an example utterance finalizer 600. The utterance finalizer 600 can correspond to the utterance finalizer 114 as depicted in FIG. 1. The utterance finalizer 600 can be implemented on one or more computing devices in one or more locations. The utterance finalizer 600 can include a speech cache 602, an utterance checking engine 604, and a safety timer 606. The speech cache 602 can receive and store an utterance input 608, such as from a speech to text module. The utterance checking engine 604 can determine whether the utterance input 608 is a complete request or a fragment of a request. The utterance checking engine 604 can include an endpointing model to determine whether the utterance input 608 is completed or a fragment. For example, the endpointing model can determine the utterance is a fragment based on the last word in the utterance, such as last words "and", "with", "extra", "umm". As another example, the endpointing model can determine whether the utterance is final or fragmented using a machine learning model trained on various utterances. If utterance checking engine 604 determines the utterance input 608 is completed, the utterance checking engine 604 outputs the utterance input as an utterance output 610 to send to a semantic understander. If the utterance checking engine 604 determines the utterance input 608 is a fragment, the utterance checking engine 604 waits until the remainder of the request is provided from the speech to text module. The safety timer 606 can be configured to send the utterance input 608 as output 610 after a predetermined period of time, such as 5-30 seconds.

Figure 7:
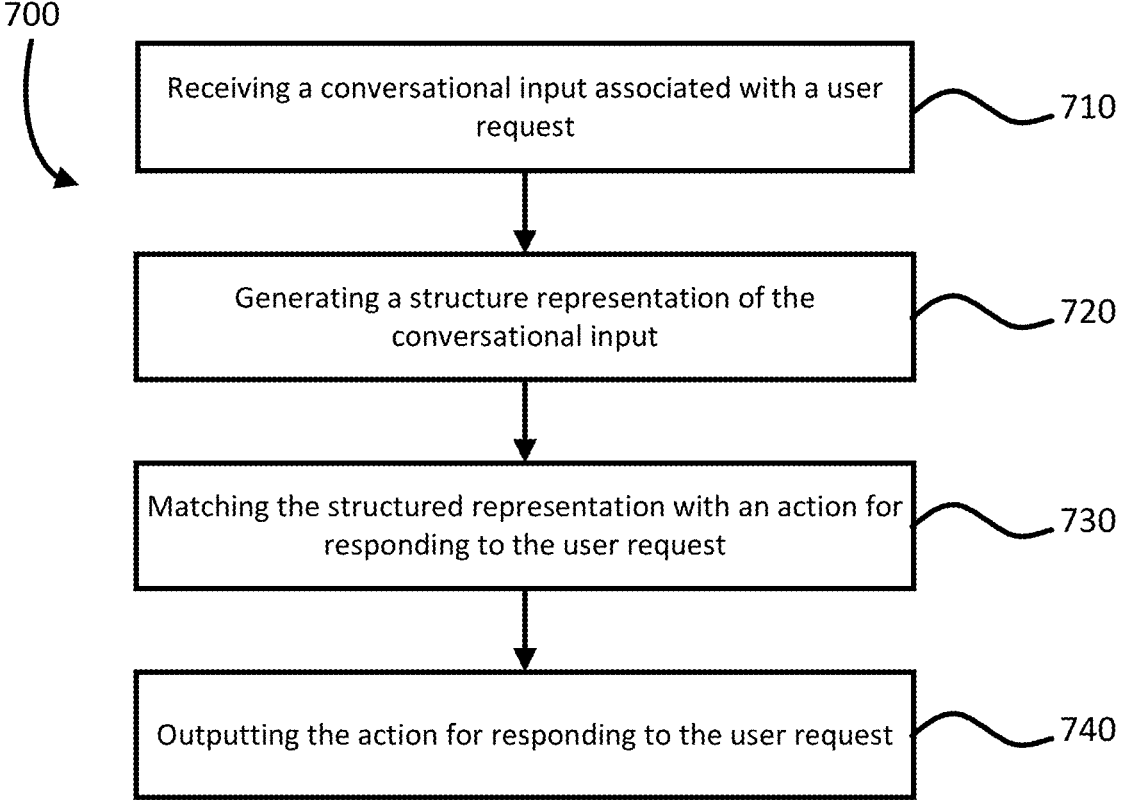
FIG. 7 depicts a flow diagram of an example process for processing a conversational transaction according to aspects of the disclosure.

FIG. 7 depicts a flow diagram of an example process 700 for processing a conversational transaction. The example process 700 can be performed on a system of one or more processors in one or more locations, such as the transactional agent system 100 as depicted in FIG. 1.

As shown in block 710, the transactional agent system 100 can receive a conversational input associated with a user request. The transaction agent system 100 can receive the conversational input from a user device, a speech kiosk for receiving speech input, and/or from an input kiosk for receiving text input. The conversational input may be natural language speech and/or text received from a user. Example user requests can include ordering one or more items from a menu, depositing checks at a bank, ordering one or more products from a website, and/or resolving an issue related to customer service.

As shown in block 720, the transactional agent system 100 can generate a structured representation of the conversational input using an instruction-prompted machine learning model. The structure representation can be a JSON format. The instruction-prompted machine learning model can be an LLM. The transactional agent system 100 can generate the structured representation based on a current action state, a conversation history, and/or the conversational input. The transactional agent system 100 can further generate the structured representation by updating actions.

As shown in block 730, the transactional agent system 100 can match the structured representation with an action for responding to the user request using an encoder-based machine learning model. The encoder-based machine learning model can be a two-tower encoder-only LLM and a fast nearest-neighbor matcher. The transactional agent system 100 can match the structured representation by generating an embedding to represent the structured representation. The transactional agent system 100 can match the embedding with one or more embeddings representing a catalog of potential actions or responding to the user request.

As shown in block 740, the transactional agent system 100 can output the action for responding to the user request. The transactional agent system 100 can also output that further clarification is needed in response to multiple matching actions or no matching action.

FIG. 8 depicts a flow diagram of an example process 800 for processing a conversational transaction where the conversational input is received through a speech kiosk, such as at a drive thru. The example process 800 can be performed on a system of one or more processors in one or more locations, such as the transactional agent system 100 as depicted in FIG. 1.

As shown in block 810, the transactional agent system 100 can receive a vocal utterance associated with a user request. Example user requests can include ordering one or more items from a menu or conducting a transaction at a bank.

As shown in block 820, the transactional agent system 100 can convert the vocal utterance to a textual utterance. The transactional agent system 100 can convert the vocal utterance using any speech recognition technology.

As shown in block 830, the transactional agent system 100 can determine whether the textual utterance is a complete request or fragmented request using an endpointing model. The transactional agent system 100 can determine whether the textual utterance is completed or fragmented based on a last word in the textual utterance, such as "and", "with", "extra", "umm". The transactional agent system 100 can further determine whether the textual utterance is completed or fragmented using a LLM trained on prior or synthetic textual utterances.

As shown in block 840, the transactional agent system 100 can wait for the remainder of the user request in response to determining that the textual utterance is a fragmented request. The transactional agent system 100 can wait for one or more additional textual utterances to form the complete request.

As shown in block 850, the transactional agent system 100 can output the textual utterance to be generated into a structured representation of the user request in response to determining that the textual utterance is a complete request. The transactional agent system 100 can provide the textual utterance to a semantic understander for generating the structured representation.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" or "module" refers to a software-based system, subsystem, or process that is programmed to perform one or more specific functions. The engine or module can be implemented as one or more software modules or components or can be installed on one or more computers in one or more locations. A particular engine or module can have one or more computers dedicated thereto, or multiple engines or modules can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing a conversational transaction comprising:

receiving, by one or more processors, a first conversational input associated with a user request;

generating, by the one or more processors, a first structured representation of the first conversational input using an instruction-prompted machine learning model;

receiving, by the one or more processors, a second conversational input associated with the user request;

generating, by the one or more processors, a second structured representation of the second conversational input using the instruction-prompted machine learning model based on the first structured representation;

matching, by the one or more processors, the second structured representation with an action for responding to the user request using an encoder-based machine learning model, wherein the matching comprises:

generating an embedding to represent the second structured representation; and matching the embedding with one or more embeddings representing candidate actions for responding to the user request; and outputting, by the one or more processors, the action for responding to the user request.

2. The method of claim 1, wherein:

the first and second conversational inputs are vocal utterances; and the method further comprises converting, by the one or more processors, at least one of the vocal utterances to a textual utterance.

3. The method of claim 2, further comprising:

determining, by the one or more processors, that the textual utterance is a fragmented request; and waiting, by the one or more processors, for the remainder of the user request in response to determining the textual utterance is a fragmented request.

4. The method of claim 3, wherein determining the textual utterance is a fragmented request is based on at least one of a processing via an endpointing model, a last word in the textual utterance, or processing via a large language model (LLM).

5. The method of claim 1, wherein generating the second structured representation further comprises updating actions based on a current action state, a conversation history, and the first and second conversational inputs.

6. The method of claim 1, wherein outputting the action for responding to the user request further comprises outputting further clarification is needed in response to multiple matching actions.

7. A system comprising:

one or more processors; and one or more storage devices coupled to the one or more processors and storing instructions that, when executed by the one or more processors, cause the one or more processors to perform operations for processing a conversational transaction, the operations comprising:

receiving a first conversational input associated with a user request;

generating a first structured representation of the first conversational input using an instruction-prompted machine learning model;

receiving a second conversational input associated with the user request;

generating a second structured representation of the second conversational input using the instruction-prompted machine learning model based on the first structured representation;

matching the second structured representation with an action for responding to the user request using an encoder-based machine learning model, wherein the matching comprises:

generating an embedding to represent the second structured representation; and matching the embedding with one or more embeddings representing candidate actions for responding to the user request; and outputting the action for responding to the user request.

8. The system of claim 7, wherein:

the first and second conversational inputs are vocal utterances; and the operations further comprise converting at least one of the vocal utterances to a textual utterance.

9. The system of claim 8, wherein the operations further comprise:

determining that the textual utterance is a fragmented request; and waiting for the remainder of the user request in response to determining the textual utterance is a fragmented request.

10. The system of claim 9, wherein determining the textual utterance is a fragmented request is based on at least one of a processing via an endpointing model, a last word in the textual utterance, or processing via a large language model (LLM).

11. The system of claim 7, wherein generating the second structured representation further comprises updating actions based on a current action state, a conversation history, and the first and second conversational inputs.

12. The system of claim 7, wherein outputting the action for responding to the user request further comprises outputting further clarification is needed in response to multiple matching actions.

13. A non-transitory computer readable medium for storing instructions that, when executed by one or more processors, cause the one or more processors to perform operations for processing a conversational transaction, the operations comprising:

receiving a first conversational input associated with a user request;

generating a first structured representation of the first conversational input using an instruction-prompted machine learning model;

receiving a second conversational input associated with the user request;

generating a second structured representation of the second conversational input using the instruction-prompted machine learning model based on the first structured representation;

matching the second structured representation with an action for responding to the user request using an encoder-based machine learning model, wherein the matching comprises:

generating an embedding to represent the second structured representation; and matching the embedding with one or more embeddings representing candidate actions for responding to the user request; and outputting the action for responding to the user request.

14. The non-transitory computer readable medium of claim 13, wherein:

the first and second conversational inputs are vocal utterances; and the operations further comprise:

converting at least one of the vocal utterances to a textual utterance;

determining that the textual utterance is a fragmented request; and waiting for the remainder of the user request in response to determining the textual utterance is a fragmented request.

15. The non-transitory computer readable medium of claim 13, wherein generating the second structured representation further comprises updating actions based on a current action state, a conversation history, and the first and second conversational inputs.

\* \* \* \* \*